(No Model.)

2 Sheets—Sheet 1.

T. B. ATTERBURY.
GLASS MOLD AND MANUFACTURE OF GLASS BOXES.

No. 265,299. Patented Oct. 3, 1882.

WITNESSES

INVENTOR
Thos. B. Atterbury
Attorney (No Model.)   
T. B. ATTERBURY.   
GLASS MOLD AND MANUFACTURE OF GLASS BOXES.
No. 265,299. Patented Oct. 3, 1882.
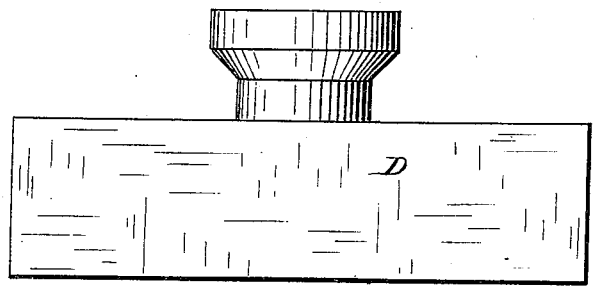
Fig. 5.
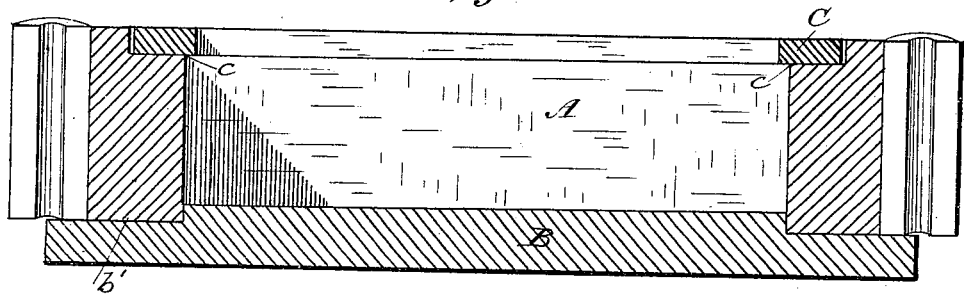
Fig. 6.
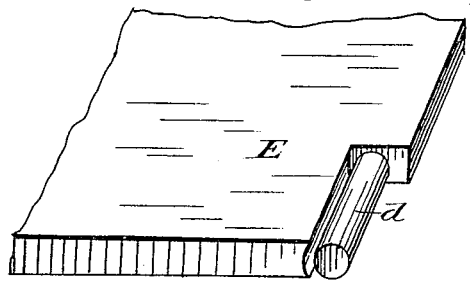
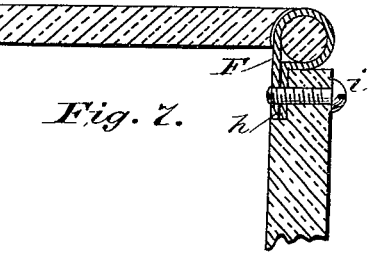
Fig. 7.
Fig. 10.
Fig. 8.
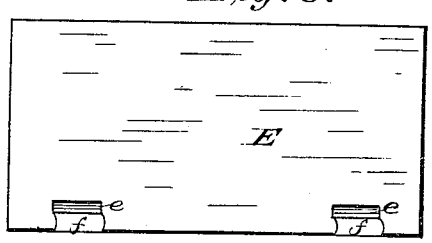
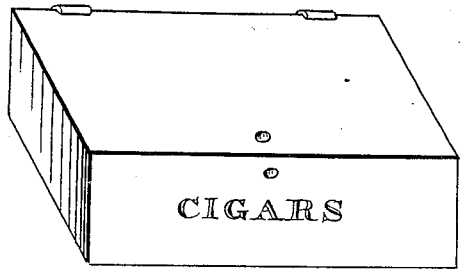
WITNESSES
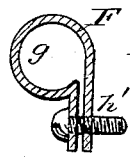
Fig. 9.
INVENTOR
Attorney

UNITED STATES PATENT OFFICE.

THOMAS B. ATTERBURY, OF PITTSBURG, PENNSYLVANIA.

GLASS-MOLD AND MANUFACTURE OF GLASS BOXES.

SPECIFICATION forming part of Letters Patent No. 265,299, dated October 3, 1882.

Application filed September 4, 1882. (No model.)

*To all whom it may concern:*

Be it known that I, THOMAS B. ATTERBURY, a citizen of the United States, residing at Pittsburg, in the county of Allegheny and State of Pennsylvania, have invented certain new and useful Improvements in Glass-Molds and in the Manufacture of Glass Boxes; and I do declare the following to be full, clear, and exact description of the invention, such as will enable others skilled in the art to which it appertains to make and use the same, reference being had to the accompanying drawings, and to the letters and figures of reference marked thereon, which form a part of this specification.

My invention relates to the manufacture of glass boxes and in molds for producing the same; and my invention consists in the construction of the molds, and in the manner of manipulating the same to produce boxes or like articles entirely of glass.

Figure 1:
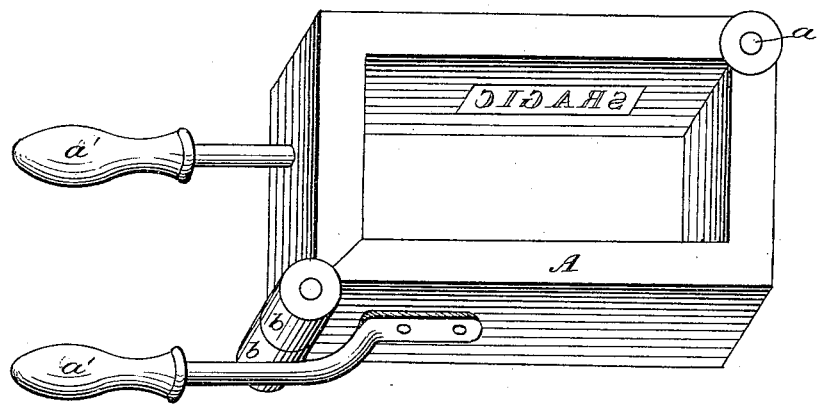
Figure 2:
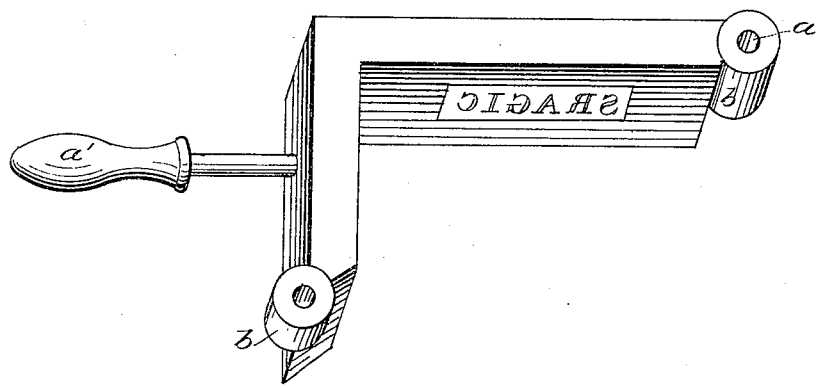
Figure 3:
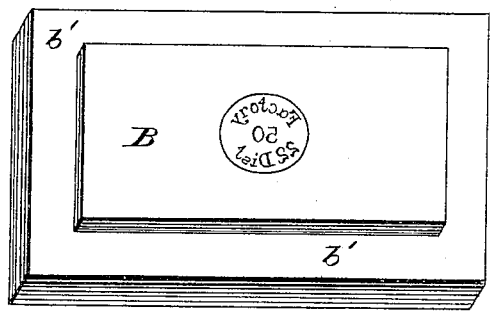
Figure 4:
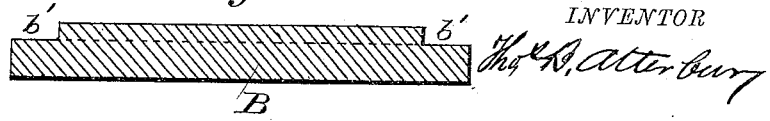

Figure 1 is a view in perspective of the sides of the molds as adapted to be placed on the base-plate. Fig. 2 is a view in perspective of one-half of the mold shown in Fig. 1. Fig. 3 is a view in perspective of the base-plate or bottom of the mold. Fig. 4 is a sectional view of the base-plate shown in Fig. 3. Fig. 5 is a sectional view of the mold, with sides, base-plate, and ring in position, and the plunger shown in elevation. Fig. 6 is a detached and broken view of a portion of the lid, showing the pintle formed thereon for the hinge which secures the top to the main portion of the box. Fig. 7 is a sectional view of a portion of the box, showing the hinge which connects the top to the main portion of the box. Fig. 8 is a top view of the lid, showing another form or modification of the pintle for the reception of the hinge. Fig. 9 is a detached view of the strap-hinge for securing the lid to the main portion of the box. Fig. 10 is a perspective view of a completed box.

In the drawings, A is the body of the mold, hinged at *a*, and is provided with handles *a' a'* to open and close the same. The body of the mold is also provided with perforated lugs *b b*, by which the sections of the mold are secured together by a pin passing through the perforations in the lugs, as is common in this class of molds.

B indicates the bottom of the mold, and is provided with a ledge or offset, *b'*, for the reception of the body of the mold, and by which the body of the mold is held in position and prevented from moving from one side to the other.

C is the top ring, which rests in a recess, *c*, in the top of the mold-body.

D is the plunger, of proper form and dimensions to fit within the body of the mold, leaving a sufficient space for the article to be formed.

The parts of the mold above described being placed in position, the molten glass is placed within the mold and the plunger forced down, as is common in the art of pressing glass. This forms a box or receptacle the sides, ends, and bottom of which are of one piece of glass having a uniform thickness throughout. This is a very important feature, for the reason that better results are attained in annealing the articles and there is less liability of breakage; but I do not confine myself to a box or article of like character having plain surfaces, as it is obvious that they may be made corrugated or ribbed without departing from the spirit of my invention.

E is the lid or top of the box, and in Fig. 6 I have shown said lid with a pintle, *d*, formed thereon in the process of molding, and by which the lid or cover is attached to the main body of the box by a strap-hinge, which will be more fully hereinafter described.

In Fig. 8 I have shown another form of pintle, in which the pintle is connected at both ends to the main portion of the lid, or, in other words, the plunger for forming the lid is provided with projections for forming the recesses *e e* and the rounded portions *f f* for the reception of the strap-hinge.

Instead of making the lid so as to be hinged to the main portion of the box, I may find it convenient to make it with a projecting ledge and of sufficient size to fit over the main portion of the box, as is common in paper and wooden boxes.

It is understood that I make the lid of my box of glass also; but I have not thought it necessary to show the mold or appliances for making such lid, but leave that to the domain of the skilled mechanic in this art.

F is the strap-hinge, made of sheet metal or other suitable material, and is bent to the form shown, so as to form an eye, *g*, which surrounds the pintle of the lid, while the projecting ends *h'* of the strap are brought down and secured in a recess, *h*, formed in the side of the box, by means of a rivet or screw, *i*, which passes through the side of the box, and also through the ends *h'* of the strap, and by which means I have a cheap, strong, and durable hinge for connecting the lid to the main body of the box.

I may find it convenient and desirable to form a groove or depression around and in the upper edge of the main portion of the box, so that a strip of sponge or other liquid containing or holding material can be placed therein to keep the contents of the box moist, and where an effectual seal is required a rubber strip may be placed in said groove to exclude the atmosphere from the inside of the box.

The mold-body A, and also the base B, are provided with recesses, into which plugs or pieces having letters, figures, or designs of any kind thereon are inserted. The bottom of the mold, in which the lid is formed, may also be provided with like devices, and by which the desired label or brand is placed thereon, it being understood that the letters, figures, or designs are made in relief, or in depression on the detachable pieces, so that the letters will appear on the article in relief or in depression, whichever may be desired, and thus words indicating the contents of the box, a particular trade-mark, and, if the box be for cigars, snuff, tobacco, or any article on which there is a national or State tax, the number of the factory and district can be readily stamped thereon or therein in the manufacture of such boxes or receptacles.

In order to contrast the color of the letters or design from the body of the box, the letters can be readily painted over to suit the fancy of the dealer or manufacturer. These boxes are primarily intended for storing and holding cigars, tobacco, snuff, and confections; but I do not wish to limit myself to such use, as it is obvious that they may be used to advantage in packing or storing any material or article which is liable to deteriorate by contact with wood or paper, or be subject to change from climatic changes or atmospheric influences.

Fine brands of cigars are ofttimes pronounced by judges to be of a poor quality or worthless, owing to the absorption of the oils and the loss of flavor by the action of the wood by which they are surrounded, thus causing pecuniary loss to the dealer; but where such cigars are placed in a glass box and entirely isolated from atmospheric influence the oils of the tobacco are held intact and the moisture of the leaf retained, so that after a long period of time has elapsed the cigars will be found to be as fresh and fragrant as when first made. So it may be said of confections. If the saccharine matter of which they are composed is kept from contact with the air, it will not crystallize further or become hard and worthless, as is too often the case when packed in wooden or paper boxes. I make these boxes of various colors of glass, clear, opal, amber, blue, green, red, black, or any desired color or mixture of colors, and of any desired size—to hold fifty or one hundred cigars or two ounces of snuff or other material up to any desired and convenient capacity required.

Having thus described my invention, what I claim, and desire to secure by Letters Patent, is—

1. In the manufacture of glass boxes and other like articles, the mold herein described, consisting of the recessed base-plate B, body A, and ring C, in combination with the plunger D, as and for the purpose set forth.

2. As a new article of manufacture, a glass-box blank the sides, ends, and bottom of which are made or pressed from a single body of glass, as set forth.

3. The glass box herein described, consisting of the main body, formed of one piece of glass, with the lid made also of glass, whether said parts are or are not connected by a hinge-joint, as set forth.

In testimony whereof I affix my signature in presence of two witnesses.

THOMAS B. ATTERBURY.

Witnesses:
 D. P. BERG,
 JULIUS STENGEL.